United States Patent [19]

Valentine

[11] 4,436,010

[45] Mar. 13, 1984

[54] APPARATUS FOR CUTTING FUSIBLE MATERIAL

[76] Inventor: John M. Valentine, 14975 E. Columbia Dr., Aurora, Colo. 80014

[21] Appl. No.: 273,654

[22] Filed: Jun. 15, 1981

[51] Int. Cl.³ .......................... B26F 3/12; B29C 17/10

[52] U.S. Cl. .................................... 83/171; 83/651.1; 83/414 R; 83/733; 30/140

[58] Field of Search .................. 83/171, 651.1, 411 R, 83/733; 30/140; 145/33 R, 33 D; 269/166, 168, 169

[56] References Cited

U.S. PATENT DOCUMENTS

| | | | |
|---|---|---|---|
| 2,472,022 | 5/1949 | Neal | 269/166 |
| 2,653,633 | 9/1953 | Anderson | 83/733 |
| 2,705,035 | 3/1955 | Hammarstrom | 145/33 R |
| 3,018,355 | 1/1962 | Wallerstein | 83/171 |
| 3,332,459 | 7/1967 | Gilmore | 83/411 R |

FOREIGN PATENT DOCUMENTS

| | | | |
|---|---|---|---|
| 1437365 | 3/1966 | France | 83/171 |

*Primary Examiner*—Donald R. Schran
*Attorney, Agent, or Firm*—Don J. Flickinger

[57] ABSTRACT

The upper end of an elongate electrical resistance cutting element, extending upwardly from a workpiece supporting table, is movably positionable along an arcuate position of a support member to adjustably vary the cutting angle. A fence for guiding the workpiece during straight line cutting is detachably securable to the table. Alternately, the workpiece may be engaged by a circle guide for establishing a center of rotation for the cutting of cylindrical shapes. An auxiliary cutting unit, especially adapted for free hand cutting and sculpturing, is connectable to the integral electrical energy supply means.

13 Claims, 10 Drawing Figures

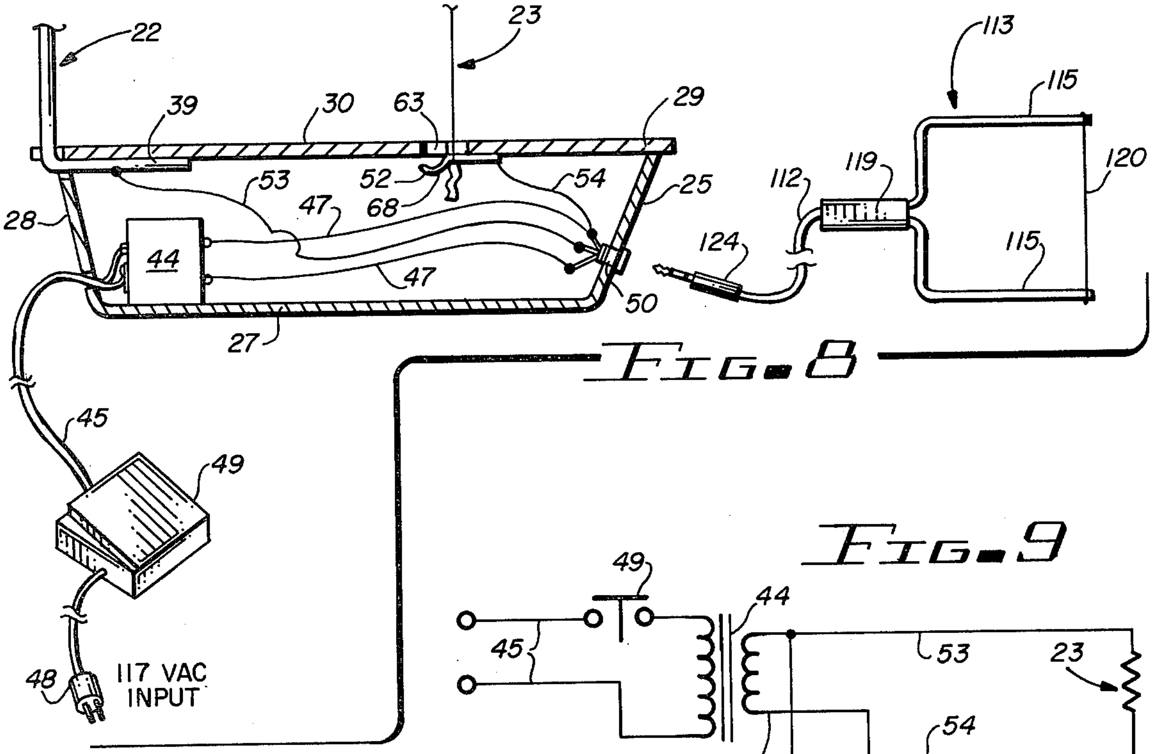
FIG. 8
FIG. 9
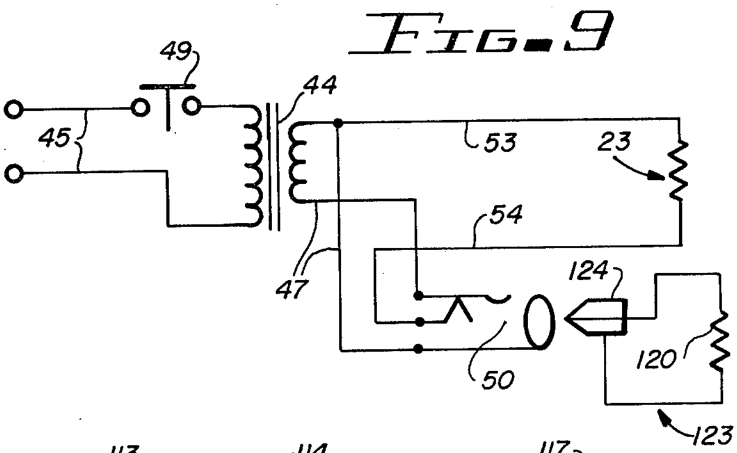
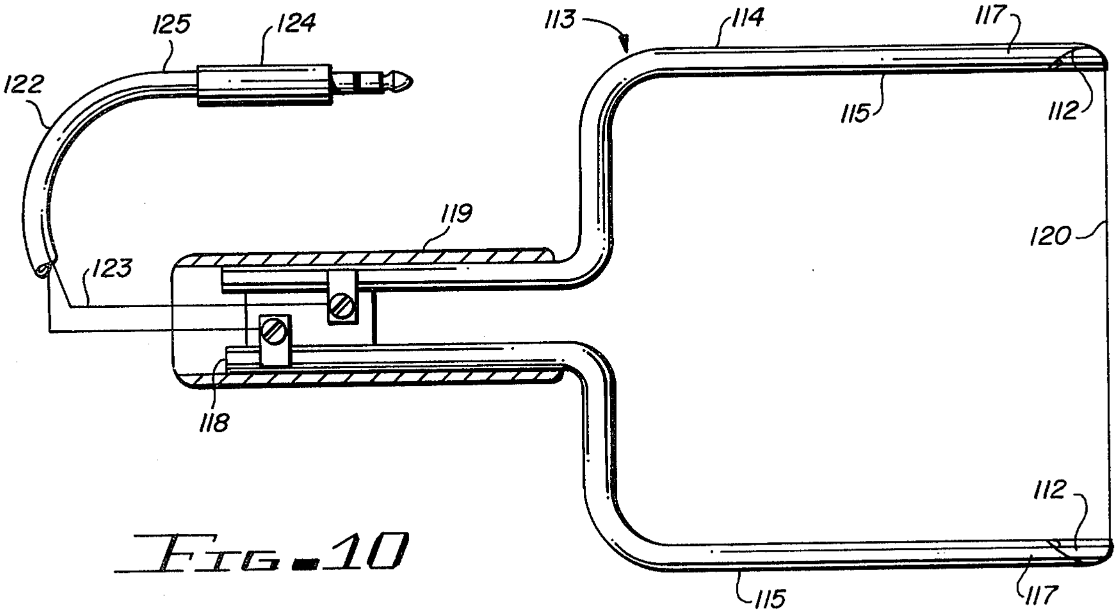
FIG. 10

APPARATUS FOR CUTTING FUSIBLE MATERIAL

FIELD OF THE INVENTION

This invention relates to devices for cutting by heat. In a further aspect, the present invention relates to devices having an electrical resistance element especially adapted for cutting and shaping fusible material.

More particularly, the instant invention concerns improvements for apparatus of the immediate type.

PRIOR ART

The prior art is replete with various devices which utilize heat generated by passing electrical current through a resistance element to cut fusible material.

Commonly, such devices include a base having a housing and a table. An elongate cutting element, usually a high resistance wire such as Nichrome, extends upwardly from the table to a support member. Means for supplying electrical energy to the cutting element, such as a battery or a transformer, is carried within the housing portion of the base.

Referred to as hot wire cutters and other colloquial names, the devices are exceedingly popular for avocational pursuits such as the production of Christmas ornaments, fabrication of model airplanes and the creation of decorative silhouette forms. During operation, the fusible material workpiece is supported upon the top surface of the table and manually moved as the material is severed along a prescribed line. Suitable material, such as the synthetic resin products known as thermoplastics, are readily available in hobby and arts and crafts stores. Exemplary is expanded polystyrene which is commercially available in blocks and sheets of various thickness.

In addition to the basic apparatus, the prior art has provided various ancillary features for the convenience of the user. For example, in order to facilitate the removal of the center portion of a closed form, such as in the creation of a cylindrical section, the upper end of the cutting element is easily removed from the support member to be passed through a preformed bore in the workpiece. A fence or guide to assist in cutting along a straight line is detachably securable to the table. Also known are tilting tables which give an oblique cut to the edge of the material. The prior art has also envisioned the cutting of circles by providing a rotary member upon which the material is supported.

The foregoing accessory items have not, however, provided an entirely satisfactory solution for the performance of supplemental operations. The center of rotation, for example, of present circle cutting attachments is not infinity adjustable. Further, the rotary device is cumbersome to use and does not adequately support the workpiece. Current apparatus for cutting angles are equally cumbersome and, in addition, impose restriction on the size and configuration of the workpiece. Further limitations are imposed by known guides which, although adequately directing the workpiece along a linear path, are cumbersome to manipulate. Further inadequacies are noted by the failure of the prior art to provide for convenient replacement of the cutting element which is subject to breaking. Free hand cutting and sculpturing has apparently been ignored by the foregoing prior art devices.

It would be highly advantageous, therefore, to remedy the foregoing and other deficiencies inherent in the prior art.

Accordingly, it is an object of the present invention to provide an improved apparatus for the cutting of fusible material.

Another object of the invention is the provision of easily adjustable means for cutting the material along an angled or beveled edge.

Another object of the invention is to provide angled cutting means which will not impose restrictions upon the use of the apparatus.

Still another object of this invention is to provide improved means for guiding the material during a circular cutting.

And still another object of the invention is the provision of means for cutting circles of infinitely variable radius.

Yet still another object of the immediate invention is to provide a circle guide accessory which is usable with the fusible material workpiece stabley supported upon the table.

And a further object of the invention is the provision of an apparatus having means for rapid and convenient replacement of the cutting element.

Still a further object of the instant invention is to provide an improved guide or fence for directing the workpiece during the making of linear cuts.

Yet still a further object of the invention is the provision of a fence which is conveniently usable and readily removable from the apparatus.

And still a further object of the invention is to provide attachment means for free hand sculpturing.

SUMMARY OF THE INVENTION

Briefly, to achieve the desired objects of the instant invention in accordance with a preferred embodiment thereof, first provided is a base including a table having a top for supporting a workpiece of fusible material. An elongate, electrical resistance cutting element extends upwardly from the table to a support member extending upwardly from the base and having a terminal section residing at an elevated position above the top surface of the table. Electrical supply means provide electrical energy to the cutting element. The base, the support member, the cutting element and the electrical supply means are conventional and readily fabricated in accordance with known prior art techniques.

The invention contemplates attachment means carrying the upper end of the cutting element and adjustably positionable along the terminal portion of the support member. More specifically, the attachment means includes a clamp having the upper end of the cutting element detachably secured thereto. The terminal portion of the support member is arcute, lying along an arc of a circle having the point of attachment of the lower end of the cutting element as the proximate center. Accordingly, the cutting element is angularly adjustable relative to the top surface of the table.

Next provided are circle guide means for engaging the workpiece and establishing a center of rotation. The circle guide means includes a mounting bracket detachably secured to the table and an arm extending from the bracket over the table and carrying a depending guide element. The guide element is adjustably positionable in vertical and horizontal directions relative the arm. Also provided is a work guiding fence having upstanding locking elements and infinitely positionable upon the top of the table relative to the cutting element. The fence is removable from the table in response to extended movement in a direction away from the cutting element toward the support member.

Further provided is an auxiliary cutting tool for free hand sculpturing. In accordance with a preferred embodiment, the auxiliary cutting tool includes an elongate, electrical resistance cutting element extending between members of a bifurcated frame. An electrical conductor extending from the frame terminates with an element of an electrical connection pair matingly engagable with a complemental element carried by the base and communicating with the electrical supply means.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 8 is a semi-schematic vertical sectional view of the apparatus of FIG. 1 and especially showing the electrical supply means thereof with alternate switch means and an auxiliary cutting tool detachably securable thereto;

FIG. 9 is a schematic of the electrical supply means; and

FIG. 10 is an enlarged plan view, partly in section, of the auxiliary cutting tool shown in FIG. 8.

DESCRIPTION OF THE PREFERRED EMBODIMENTS

Figure 1:
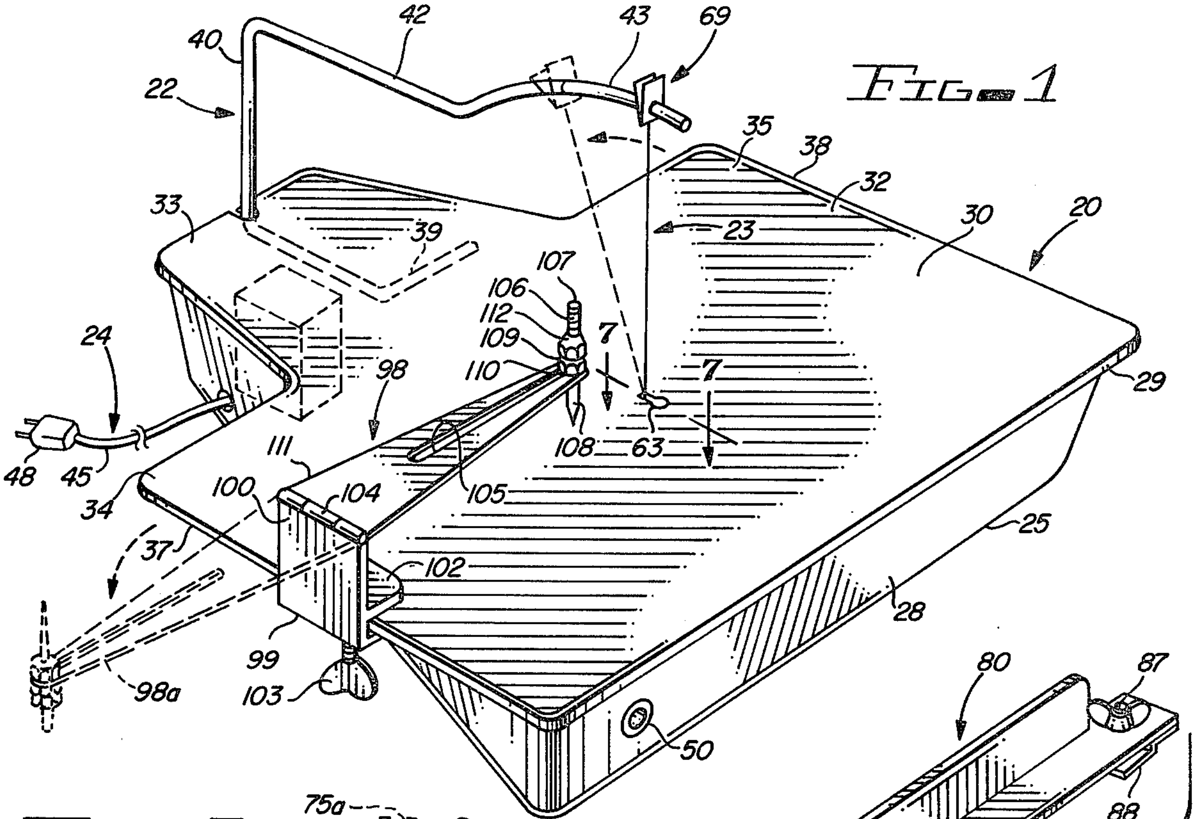
FIG. 1 is a perspective view of an apparatus for cutting and shaping a fusible material workpiece embodying the improvements of the instant invention.

Turning now to the drawings in which like reference characters indicate corresponding elements through the several views, attention is first directed to FIG. 1 which shows an apparatus for cutting and shaping a fusible material workpiece including a base, a support member, an elongate electrical resistance cutting element and electrical supply means generally designated by the reference characters 20, 22, 23 and 24, respectively. In general, analogous components of a similar structure and function are found in prior art devices of the immediate type. However, the components are modified in accordance with the improvements of the instant invention as will become apparent during the ensuing description.

In accordance with the instant invention, base 20 includes housing 25, preferrably fabricated of a dielectric. Especially suitable for the purpose are thermoplastic resins such as acrylonitrile butadiene styrene. As seen in FIG. 8, housing 25 includes bottom 27 and upstanding continuous side wall 28. Table 29, having top surface 30, is supported by side wall 28 and closes housing 25. Table 29 further includes a main portion 32 and narrowed rearwardly extending portion 33. Lateral terminal portions 34 and 35, terminating with edges 37 and 38, respectively, extending along either edge of main portion 32, project beyond housing 25.

Support member 22, having the general shape commonly referred to as gooseneck, includes base segment 39, upright segment 40 and cantilevered segment 42 extending over top 30 and residing at an elevated position above top 30. Base segment 39 is secured to base 20 in accordance with standard prior art technique. In a preferred arrangement, base segment 39 is secured to the under side of table 29 by conventional fastening means. Upright segment 40 extends from base 20 proximate the rearward end of rearwardly extending portion 33 of table 29. The terminal portion 43 of cantilevered segment 42 is generally arcuate, lying along a circle having a center substantially at the point of attachment of the lower end of cutting element 23 as will be later described in further detail.

Electrical supply means 24, as best viewed in FIGS. 8 and 9, includes transformer 44, primary leads 45 and secondary leads 47. Current, through primary lead 45 which terminates with plug 48, is controlled by switch 49. For convenience of the operator, it is preferred that switch 49 be of the foot actuated type. In accordance with conventional practice, well established in the prior art, line current received through primary lines 45, is stepped down by transformer 44 to a usable range, generally between three and nine volts, and passed onto secondary leads 47.

A conventional closed circuit phone jack receptable 50 is carried in side wall 28 of housing 25. Secondary electrical leads 47 communicate between transformer 44 and receptacle 50.

Contact element 52 is secured to the under side of table 29. Conductor 53 communicates between receptacle 50 and support member 22. Conductor 54 communicates between receptacle 50 and contact element 52. The circuit between conductors 53 and 54 is completed by cutting element 23 which is energized in response to closing normally open switch 49. Further description of receptacle 50 will be made presently.

Figure 6:
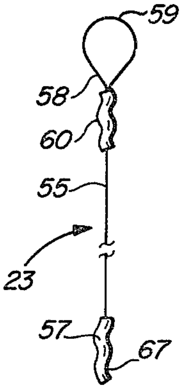
FIG. 6 is an enlarged elevation view of an improved electrical resistance cutting element useful in connection with the apparatus of FIG. 1, a portion thereof being broken away for purposes of illustration.

Cutting element 23, as seen in FIG. 6, is an elongate strand 55 of nickel-chromium wire or other high resistance material terminating with upper and lower ends 57 and 58, respectively. Loop 59, formed at upper end 57, is held by a crimped or swaged tube or collar 60. Enlargement 62 is similarly formed at the lower end 57.

Opening 63, formed through main portion 32 of table 29 at the approximately mid point thereof, includes first section 64 sized and shaped to receive enlargement 62 therethrough and elongate second section 65 having a width larger than the diameter of strand 55 but narrower than enlargement 62. Contact element 52 is bifurcated by slot 67 which aligns with second section 65. Downwardly directed projection 68 extends laterally across contact element 52.

Referring again to FIG. 1, there is seen attachment means, generally designated by the reference character 69, carrying the upper end of cutter element 23 and adjustably positionable along the terminal portion 43 of support member 22. Attachment means 69, as illustrated in further detail in FIGS. 2 and 3, includes first and second elements 70 and 72, respectively. First element 70 is a substantially flat metallic plate. Second element 72 includes the lower section 73 in juxtaposition with first element 70 and secured thereto by rivet 74 and upper section 75 and angularly directed away from first element 70. Elements 70 and 72 are provided with aligned apertures 77 for receiving terminal section 43 of support member 22 therethrough. Slot 78, extending laterally inward through members 70 and 72 below rivet 74, terminates with notch 79 for engaging loop 59 of cutting element 23.

Figure 2:
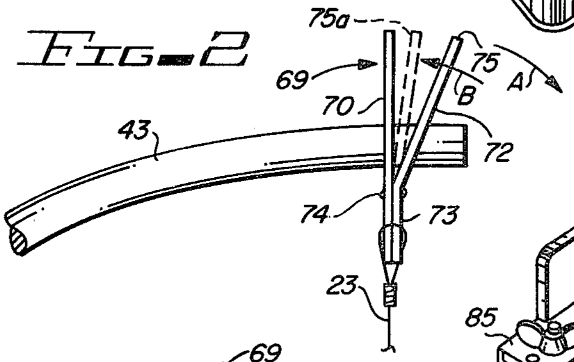
FIG. 2 is an enlarged fragmentary side elevation view of the terminal portion of the support member and further illustrating the means for detachable securement of the upper end of the cutting element thereto.
Figure 3:
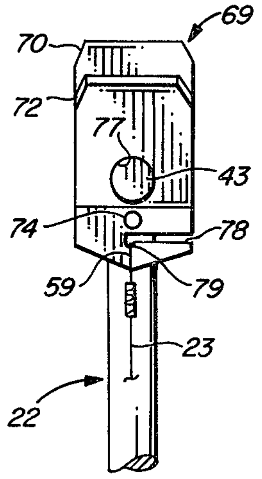
FIG. 3 is a front elevation view of that portion of the apparatus illustrated, in FIG. 2.

Element 72, being resilient, is normally biased in the direction of arrowed line A to reside in the solid line positions shown in FIG. 2. In response to application of a compressive force, such as can be applied by grasping elements 70 and 72 between the thumb and forefinger, the upper portion 75 of element 72 is movable in the direction of arrowed line B to the broken line position designated by the reference character 75B. As will be appreciated by those skilled in the art, elements 70 and 72 function as a manually manipulatable clamp having a lock position in which attachment means 69 is engaged with terminal section 43 and a release position in which attachment means 69 is movable along terminal section 43. Clamp arrangements of the immediate type in which the lock position is the normal position, are well known.

It is apparent from the foregoing description that cutting element 23 is detachably securable to base 20 and to support member 22. Loop 59 and the hook provided by slot 78 and notch 79 define means for detachably securing the upper end of cutting element 23 to attachment means 69. Engagement means for the detachable securement of the lower end of cutting element 23 to base 20 includes enlargement 62 and opening 63. Projection 68 functions as detent means for retaining a lower end of cutting element 23 within section section 65 of opening 63. During assembly, enlargement 62 is passed through opening 64 to a position below projection 68. Strand 55 is then moved through slot 67 until enlargement 62 is positioned behind detent 68. Loop 59 is then lifted upwardly and engaged through slot 78 with notch 79. Support member 22, being normally somewhat biased in a direction away from table 29, places cutting element 23 under tension. It will be appreciated that cutting element 23 is now in electrical series between conductors 53 and 54 and will be heated sufficiently to cut fusible material in response to closing of switch 49.

Cutting element 23, as seen in solid outline in FIG. 1, is substantially vertical to top surface 30 of table 29. With cutting element 23 in this position, fusible material will be cut along an edge which is squared to the side supported upon top surface 30. Angular cuts are made by releasing the clamp portion of attachment means 69 as previously described and moving the attachment means 69 along terminal section 43 to a selected position, such as shown in broken outline, in which cutting element 23 resides as a desired angle with top surface 30. The angle of cutting element 23 is quickly and accurately set by use of a protractor. At any selected position, cutting element 23 remains under equal tension since it is, in effect, the radius of the circle along which arcuate terminal section 43 lies.

Figure 4:
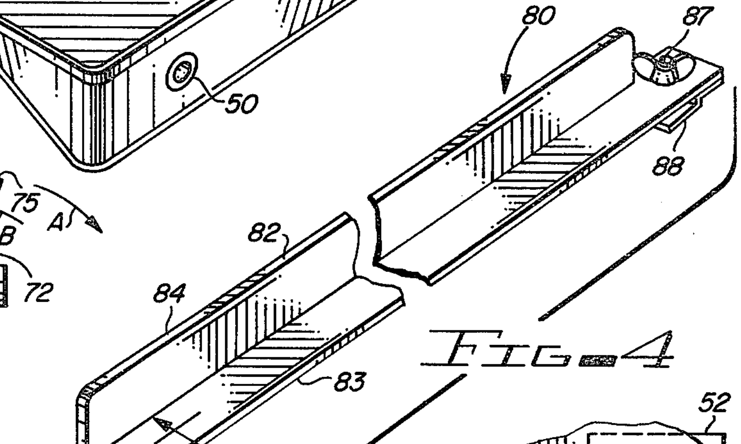
FIG. 4 is a perspective view of a fence or straight guide means usable in connection with the apparatus of FIG. 1.
Figure 7:
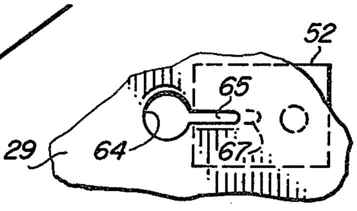
FIG. 7 is an enlarged top plan view of that portion of the apparatus designated by the line 7—7 in FIG. 1.
Figure 5:
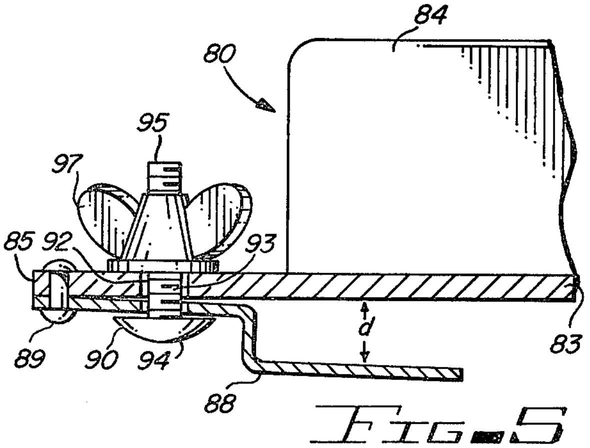
FIG. 5 is an enlarged fragmentary vertical sectional view taken along the line 5—5 of FIG. 4.

Referring now to FIGS. 4 and 5, there is seen an attachment, generally designated by the reference character 80, for assisting the user in cutting fusible material along a line parallel to a selected edge. Attachment 80 includes an elongate work guiding fence 82 having base section 83 and upright section 84. Base section 83 is adapted to be placed upon top surface 30 of table 29 with the selected edge of the fusible material held against and moved along upright section 84. Preferrably, upright section 84 has a length substantially equal to the perpendicular distance between edges 37 and 38.

Base section 83 terminates with end portions 85 and 87 projecting beyond the ends of upright section 84 and overhanging the edges 37 and 38 of table 29. A clamping element 88 is secured to each end portion 85 and 87 by a rivet 89. Bolt 90 extends through aligned apertures 92 and 93 in clamping element 88 and base section 83, respectively. It is particularly noted that head 94 of bolt 90 resides on the under side of clamping element 88 and shank 95 extends upwardly being engaged with wing nut 97 above base section 83. Preferrably, bolt 90 is stablized against rotation relative clamping element 88. For this purpose, head 94 may be braised or otherwise affixed to clamping element 88. Other well known expediencies, including the use of carriage bolts, will readily occur to those skilled in the art.

When wing nut 97 is tightened on bolt 90, clamping element 88 is urged in a direction toward base section 83 to a terminal distance d sufficient to clamp the terminal portions 34 and 35 of table 29 therebetween. Clamping element 88 is movable in a direction away from base element 83 a sufficient distance to receive terminal portions 34 and 35 therebetween either as a result of looseness in rivet 89 or inherent resiliency in clamping element 88. It is especially noted that the particular arrangement of bolt 92 and wing nut 97 provide upstanding locking elements which are readily accessible to the user from the top invisible side of table 29. Attachment 80 is readily secured to the cutting apparatus of the instant invention by passing fence 82 over table 29 between upright segment 40 of support element 22 and cutting element 23. Base element 83 is then placed upon the narrowed rearwardly extending portion 33 and moved forwardly onto main portion 32 with lateral terminal portions 34 and 35 being received between base section 83 and the respective clamping element 88. It will be appreciated that attachment 80 is adjustably clamped to table 29 at selectively adjustable positions. Removal of attachment 80 is in response to extended movement in a direction away from cutting element 23.

Circle guide means, generally designated by the reference character 98, and usable in combination with the instant apparatus and various prior art devices, will now be described with reference to FIG. 1. Circle guide means 98 includes mounting bracket 99 having support section 100 from which extends fixed jaw 102. Movable jaw 103, which may be in the form of a wing screw as illustrated, opposes fixed jaw 102. Mounting bracket 99 is secured to base 20 by placing fixed jaw 102 on top surface 30 and receiving an edge of table 29 between fixed jaw 102 and movable jaw 103. Arm 111, which is affixed to bracket 99 by hinge 104, extends over table 29 and is spaced above top surface 30 to receive a workpiece therebetween. Elongate slot 105 extends along a portion of the length of arm 111.

Guide element 106 is carried by arm 111 and adjustable positionable along slot 105. In accordance with a preferred embodiment of the invention, guide element 106 includes elongate threaded shaft 107 having pointed lower end 108 for engaging said workpiece and for establishing a center of rotation as the workpiece is rotated during cutting by cutting element 23. Threadedly engaged with shaft 107 are nuts 109 and 110 placed on opposite sides of arm 111 and jam nut 112. Nuts 109 and 110 are tightened, one against the other, to retain guide element 106 at the desired location along slot 105. Point 108 is raised and lowered to accommodate workpieces of varying thickness in response to rotation of shaft 107. The longitudinal axis of shaft 107 is generally perpendicular to the top surface 30 of table 29. Other means, such as collets and set screws, for adjustably positioning shaft 107 along the longitudinal axis will readily occur to those skilled in the art.

Mounting bracket 99 is adjustably positionable along the edge of table 29. Guide element 106 is adjustably positionable along arm 111. Accordingly, it is apparent that pointed end 108, which establishes the center of rotation during cutting, is infinitely variably positionable relative cutting element 23 whereby a circle of any selected radius may be cut. It is also noted that circle guide means 98 is movable between a use position, as shown in solid outline, wherein guide element 106 is engagable with the workpiece and a non-use position, shown in the broken outline position designated 98*a*, in which the guide element 106 is remote from the workpiece.

With particular reference to FIGS. 8 and 10, there is seen an auxiliary cutting tool, generally designated by the reference character 113, especially adapted for free hand sculpturing of a fusible material workpiece. Auxiliary cutting tool 113 includes bifurcated frame 114 preferably fabricated of a pair of identical electrical conductive elements 115 having first ends 117 and second ends 118. Insulative handle 119 encases a portion of conductive elements 115 proximate the second end 118. Handle 119 also serves to hold elements 115 in the desired relationship, the elements being bonded or otherwise secured thereto.

Conventional means are provided proximate first ends 117 of conductive elements 115 for holding a second resistance cutting element 120. As illustrated, the ends of cutting element 120 are received and held in slits 121. Other expediencies such as the use of set screws and the like will readily occur to those skilled in the art.

Electrical current is supplied to second cutting element 120 by electrical conductor 122 having a first end 123 secured to conductive elements 115 and a plug 124 carried at second end 125. Plug 124 and receptable 50 are elements of an electrical connection pair for providing electrical current from electrical supply means 24 to second cutting element 120. Since receptacle 50 is of the normally closed type, insertion of plug 124 will open the integral switch removing first cutting element 23 from the circuit. Accordingly, as a safety feature, when switch 49 is closed, second cutting element 120 will become heated while first cutting element 23 will remain cold.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described and disclosed the present invention in such clear and concise terms as to enable those skilled in the art to understand and practice the same, the invention claimed is:

1. An apparatus for cutting and shaping a fusible material workpiece, said apparatus comprising:
- a. a base including a table having a top surface for supporting said workpiece;
- b. a support member extending from said base and having a downwardly arcuate terminal section residing at an elevated position above the top surface of said table;
- c. an elongate electrical resistance cutting element having
  - i. a lower end secured to said base, and
  - ii. an upper end directed toward the terminal section of said support member;
- d. attachment means carrying the upper end of said cutting element and adjustably positionable along the terminal portion of said support member; and
- e. electrical supply means for providing electrical energy to said cutting element.

2. The apparatus of claim 1, wherein said attachment means includes a clamp manipulatable between
- a lock position in which said attachment means is engaged with the terminal portion of said support member, and
- a release position in which said attachment means is movable along the terminal portion of said support member.

3. The apparatus of claim 2, wherein said clamp is normally biased into said lock position.

4. The apparatus of claim 3, wherein said clamp is moved from said lock position to said release position in response to the application of a compressive force.

5. The apparatus of claim 1, wherein said attachment means is detachably carried by said support member.

6. The apparatus of claim 1, further including means for detachably securing the upper end of said cutting element to said attachment means.

7. The apparatus of claim 6, wherein said means for detachably securing the upper end of said cutting element to said attachment means includes:
- a. a loop formed in the upper end of said cutting element; and
- b. a hook carried by said attachment means for receiving said loop.

8. The apparatus of claim 1, wherein the terminal portion of said support member lies along an arc of a circle having the center substantially coincident with the point of securement of the lower end of said cutting element to said base.

9. The apparatus of claim 1, further including engagement means for detachably securing the lower end of said cutting element to said base.

10. The apparatus of claim 9, wherein said engagement means includes:
- a. an enlargement carried proximate the lower end of said cutting element;
- b. an opening extending through said table and having
  - i. a first section sized and shaped to receive said enlargement therethrough, and
  - ii. a second section extending from said first section and having a width of a size to receive said cutting element but smaller than said enlargement.

11. The apparatus of claim 10, further including detent means for retaining said cutting element in the second section of said opening.

12. The apparatus of claim 1, further including:
- a. a work guiding fence carried upon the top surface of said table; and b. adjustment means having upstanding locking elements for securing said fence to said table at infinitely variable distances from said cutting element.

13. The apparatus of claim 12, wherein said fence is removable from said table in response to extended movement in a direction away from said cutting element toward said support member.

* * * * *